United States Patent Office 2,909,776
Patented Oct. 20, 1959

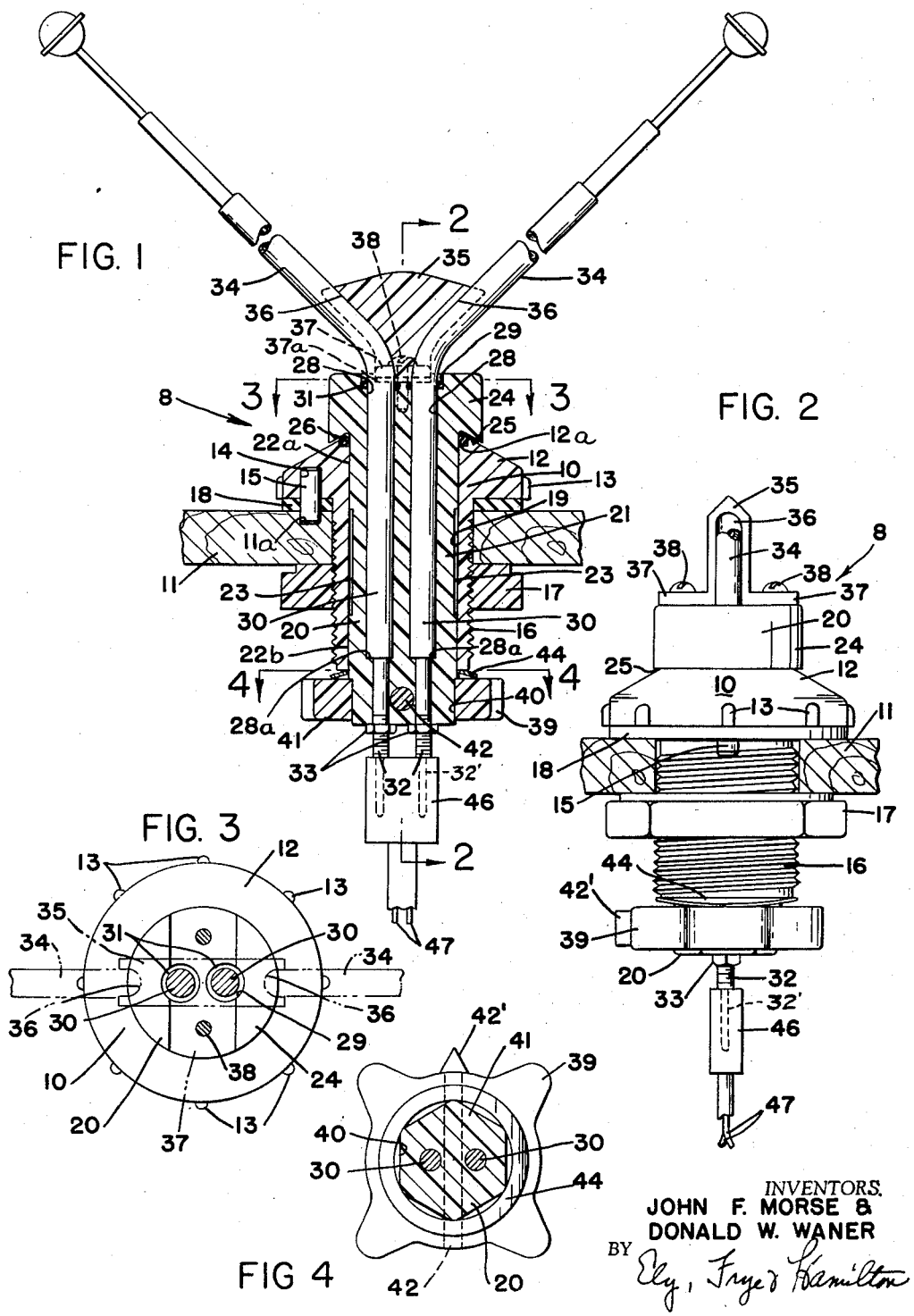

2,909,776

TELEVISION ANTENNA FOR VEHICLES

John F. Morse, Hudson, and Donald W. Waner, Munroe Falls, Ohio, assignors to The Morse Instrument Co., Hudson, Ohio, a corporation of Ohio Application October 31, 1957, Serial No. 693,708

7 Claims. (Cl. 343—709)

The present invention relates to a television antenna. More particularly, the invention relates to a television antenna especially suited and adapted for installation on marine craft having a cabin or covered cockpit.

Installations of antenna structures on marine craft and mobile vehicles must be such as to cope with conditions not encountered in stationary installations. For example, interior space limitations not only prevent extension of the antenna, but also bring reflecting surfaces closer to the antenna. Further, due to the small amount of space available in such vehicles, the bulk of the antenna structure must be kept to a minimum.

Therefore, it is a primary object of the invention to provide a rugged, weather-resistant, watertight television antenna installation especially suited for mobile or marine use.

It is another object to provide an antenna installation which is mounted exteriorly of the vehicle, and manually rotatable from the interior thereof.

A further object is to provide an improved antenna installation which can be readily dismantled for transportation or maintenance.

These and still other objects of the invention, as well as the advantages thereof, will be apparent in view of the following description and the attached drawings.

In the drawings:

Fig. 1 is a sectional view of a television antenna installation according to the invention;

Fig. 2 is a side elevation, rotated 90° substantially as indicated by line 2—2 of Fig. 1;

Fig. 3 is a section taken substantially on line 3—3 of Fig. 1; and

Fig. 4 is a section taken substantially on line 4—4 of Fig. 1.

The television antenna installation, indicated generally by the numeral 8, has an outer bushing 10 which passes snugly through a hole in the housing or roof planking 11.

The bushing 10 has an upper preferably conically tapered flange 12 with peripheral lugs 13 for ready gripping during installation or dismantling. The under surface of the flange 12 is provided with a blind bore 14 receiving a dowel pin 15 insertable in a similar bore 11a in the planking. The pin 15 provides additional rigidity to the installation and prevents rotation of the bushing 10 when in position. The body of the bushing has a circumferential thread 16 which engages the interior thread of a locking nut 17. Beneath the under surface of flange 12 is a resilient gasket seal 18. The seal 18 is preferably formed from neoprene and may have a hardness of 35–45 durometer. With the seal 18 and pin 15 in position, the bushing 10 may be securely clamped in a watertight manner to the planking 11 by rotation of the nut 17 on the threads 16. Extending axially through the bushing 10 is a cylindrical bore 19.

A rotor 20 is journaled in the bore 19 of the bushing 10. The rotor body 21 has upper and lower cylindrical bearing portions 22a and 22b with a portion 23 of reduced diameter between said bearing portions. The upper end 24 of the rotor has an enlarged diameter and is preferably provided with an undercut lip flange 25 substantially conforming to the upper surface of the bushing flange 12. A conventional O-ring seal 26 is located between the flanges 25 and 12 and radially squeezed in a groove 12a in flange 12 to provide a seal. Provision of the enlarged diameter undercut flange 25 on the rotor, cooperating with the seal 26, additionally prevents entrance of any significant amount of moisture into the bore of bushing 10.

Extending longitudinally through the rotor 20 are two identical bores 28 having slightly enlarged diameter recesses 29 at their upper ends, for receiving the inner ends 30 of two outwardly diverging metallic telescoping antenna rods. At the upper end of each bore, an O-ring seal 31 is fitted around the rod and seated in a recess 29. The lower end of each bore is reduced in diameter to form a shoulder 28a, and the rods are correspondingly shouldered. At their lower ends the rods 30 have circumferential threads 32. A brass nut 33 may be screwed on each thread 32 to secure the antenna rods within the rotor 20, and draw the shoulders on the rods against shoulders 28a in the bores.

The angularly divergent outer portion 34 of each antenna rod 30 are non-rotatively connected to the rotor by a guide key 35. The guide key 35 has identical concave portions 36 contacting a portion of the upper surface of each rod 30 and a transverse flange portion 37 for attachment by screws 38 to the top of the rotor 20. The flange portion 37 is recessed or keyed in the top of the rotor, and a resilient sealing gasket 37a below the flange portion excludes moisture from the recess and thus insulates the antenna rods from each other.

The rotor 20 may be selectively turned in the bushing 10 by grasping a knob ring 39 having a hexagonal bore 40 conforming to and fitting on the hexagonal lower end portion 41 of the rotor body 21. The knob ring 39 is secured to the rotor body 21 by a removable pin 42 having pointed projecting end 42' to indicate the setting of the rotor. Though the rotor bearing surfaces 22a and 22b are in contact with the bore of bushing 10, longitudinal movement of the rotor would be possible. Accordingly, the bushing 10 and the knob ring 39 are biased apart by a spring washer 44 to yieldingly urge the upper end 24 of the rotor downwardly against the O-ring seal 26. The yielding engagement between flange 24 and O-ring 26 serves as a friction brake to hold the rotor at any adjusted position.

The threaded lower ends 32 of each antenna rod 30 have jack pins 32' providing connection to a conventional transmission line plug 46 having lead wires 47 running to the television set (not shown).

Except as otherwise noted, the several components of the antenna 8, including the bushing 10, dowel pin 15, locking nut 17, rotor 20, guide 35 and knob ring 39 are preferably formed from a suitable plastic material which combines optimum electrical and mechanical properties.

What is claimed is:

1. An antenna system for installation through the housing of a vehicle, comprising an insulative bushing extending through the housing and having an enlarged outer head, an insulative nut screwed on the inner portion of said bushing to clamp said head against said housing, an insulative rotor journaled in said bushing and having a flanged outer end overlying the head of said bushing, a pair of antenna rods extending longitudinally through said rotor and having divergent outer ends, a guide keyed to the outer end of the rotor and non-rotatively connecting the outer ends of said rods, a knob on the inner end of said rotor for turning the rotor within said bushing, and spring means abutting said knob to urge the flanged outer end of said rotor toward the head of said bushing.

2. An antenna system for installation through the housing of a vehicle, comprising an insulative bushing extending through the housing and having an enlarged outer head with a conically tapered outer surface, an insulative nut screwed on the inner portion of said bushing to clamp said head against said housing, an insulative rotor journaled in said bushing and having a flanged outer end overlying the head of said bushing, the under surface of said flange being conically tapered to conform to the outer surface of said head, a pair of antenna rods extending longitudinally through said rotor and having divergent outer ends, means on the inner end of said rotor for turning the rotor within said bushing, and a guide keyed to the outer end of the rotor and non-rotatively connecting the outer ends of said rods.

3. An antenna system for installation through the housing of a vehicle, comprising an insulative bushing extending through the housing and having an enlarged outer head, an insulative nut screwed on the inner portion of said bushing to clamp said head against said housing, an insulative rotor journaled in said bushing and having a flanged outer end overlying the head of said bushing, resilient sealing means between said flange and said head, a pair of antenna rods extending longitudinally through said rotor and having divergent outer ends, a guide keyed to the outer end of the rotor and non-rotatively connecting the outer ends of said rods, a knob on the inner end of said rotor for turning the rotor within said bushing, and spring means abutting said knob to urge the flanged outer end of said rotor against the resilient sealing means.

4. An antenna system for installation through the housing of a vehicle, comprising an insulative bushing extending through the housing and having an enlarged outer head, means to clamp said head against said housing, an insulative rotor journaled in said bushing and having a flanged outer end overlying the head of said bushing, a pair of antenna rods extending longitudinally through said rotor and having divergent outer ends beyond said rotor, a guide keyed to the outer end of the rotor and non-rotatively connecting the outer ends of said rods, and means on the inner end of said rotor to manually rotate the rotor within the bushing.

5. An antenna system for installation through the housing of a vehicle, comprising an insulative bushing extending through the housing and having an enlarged outer head, means to clamp said head against said housing, an insulative rotor journaled in said bushing and having a flanged outer end overlying the head of said bushing, a pair of antenna rods extending longitudinally through said rotor and having divergent outer ends beyond said rotor, means securing the inner ends of said rods against longitudinal movement in said rotor, a guide keyed to the outer end of the rotor and non-rotatively connecting the outer ends of said rods, and means on the inner end of said rotor to manually rotate the rotor within the bushing.

6. An antenna system for installation through the housing of a vehicle, comprising an insulative bushing extending through the housing and having an enlarged outer head with a conically tapered outer surface, means to clamp said head against said housing, an insulative rotor journaled in said bushing and having a flanged outer end overlying the head of said bushing, the under surface of said flange being conically tapered to conform to the outer surface of said head, a pair of antenna rods extending longitudinally through said rotor and having outer ends diverging from said rotor, a resilient seal between said flange and said head, spring means urging the outer end of said rotor against said resilient seal, a pair of antenna rods extending longitudinally through said rotor and having divergent outer ends, a guide keyed to the outer end of said rotor and non-rotatively connecting the divergent outer ends of said rods.

7. An antenna system for installation through the housing of a vehicle, comprising an insulative bushing extending through the housing and having an enlarged outer head with a conically tapered outer surface, means to clamp said head against said housing, an insulative rotor journaled in said bushing and having a flanged outer end overlying the head of said bushing, the under surface of said flange being conically tapered to conform to the outer surface of said head, a resilient sealing ring between said flange and said head, a ring on the inner end of said rotor to manually rotate the rotor, and a spring washer engaging said ring to urge the outer end of said rotor against said seal to frictionally restrain said rotor in adjusted position.

References Cited in the file of this patent
FOREIGN PATENTS

| | | |
|---|---|---|
| 140,381 | Australia | Mar. 5, 1951 |
| 142,355 | Australia | July 23, 1951 |